United States Patent [19]

Smith

[11] 4,179,808
[45] Dec. 25, 1979

[54] CUTTING GUIDE TOOL FOR FABRICATION OF AIR DUCT TRANSITIONS AND METHOD OF ITS USE

[75] Inventor: Harvell M. Smith, Conifer, Colo.

[73] Assignee: Johns-Manville Corporation, Denver, Colo.

[21] Appl. No.: 904,662

[22] Filed: May 10, 1978

[51] Int. Cl.² ............................................. G01B 3/14
[52] U.S. Cl. ................................... 30/293; 33/174 G; 83/32
[58] Field of Search ...................... 30/289, 293; 83/32, 83/34; 33/174 G

[56] References Cited

U.S. PATENT DOCUMENTS

| | | | |
|---|---|---|---|
| 2,065,761 | 12/1936 | Smith | 30/293 |
| 2,720,706 | 10/1955 | Laine | 33/174 G |
| 2,818,644 | 1/1958 | Crawford | 30/293 |
| 3,073,364 | 1/1963 | Jones | 30/293 X |
| 3,174,225 | 3/1965 | Abraham | 30/293 X |
| 3,821,849 | 7/1974 | Grinnon | 30/293 X |
| 3,889,367 | 6/1975 | Walker | 30/289 X |

*Primary Examiner*—Jimmy C. Peters
*Attorney, Agent, or Firm*—R. M. Krone; J. J. Kelly; W. C. Anderson

[57] ABSTRACT

Tool guide for a knife-edged hand tool for use in the fabrication of an air duct transition from a sheet of fibrous material, said sheet having transversely extending folding grooves therein, for cutting from said panel a wedge-shaped piece of material of predetermined size.

4 Claims, 7 Drawing Figures

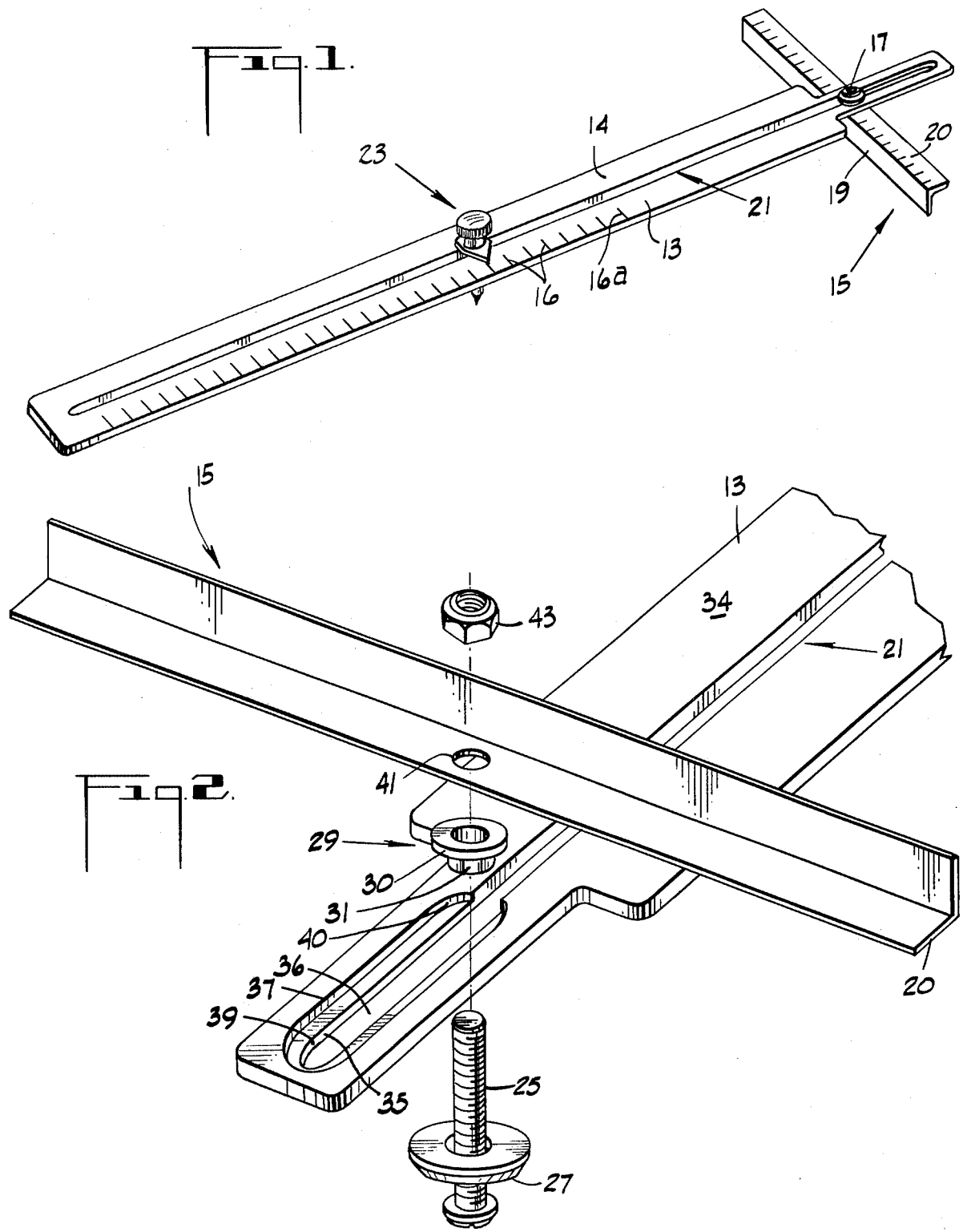

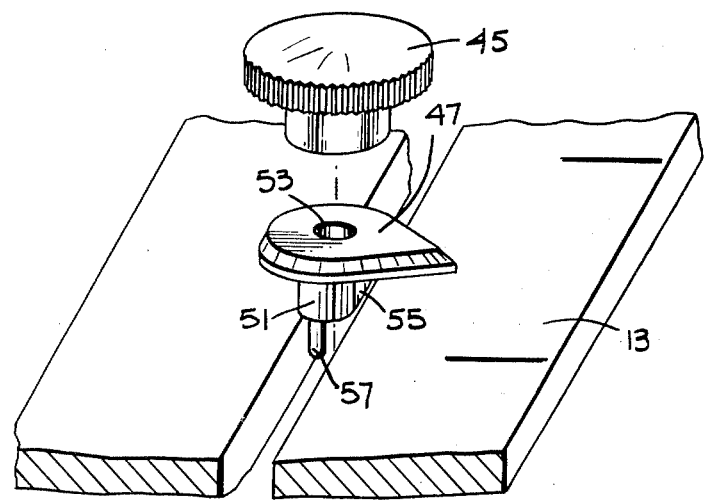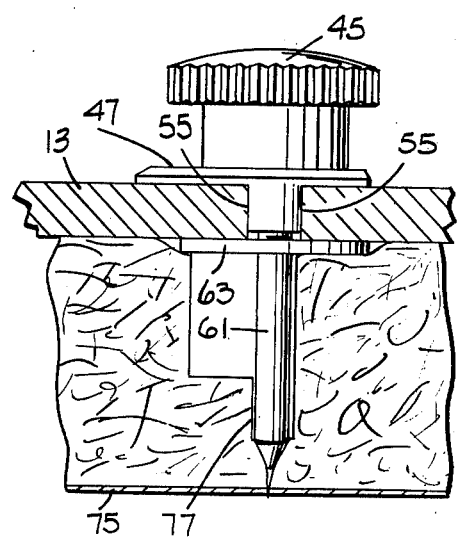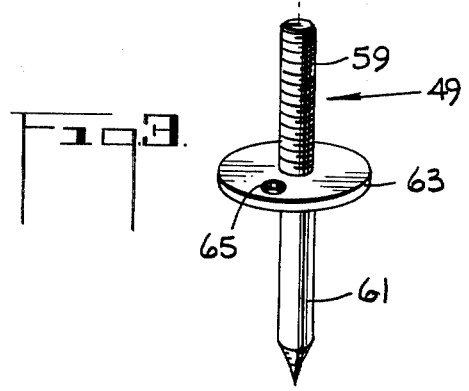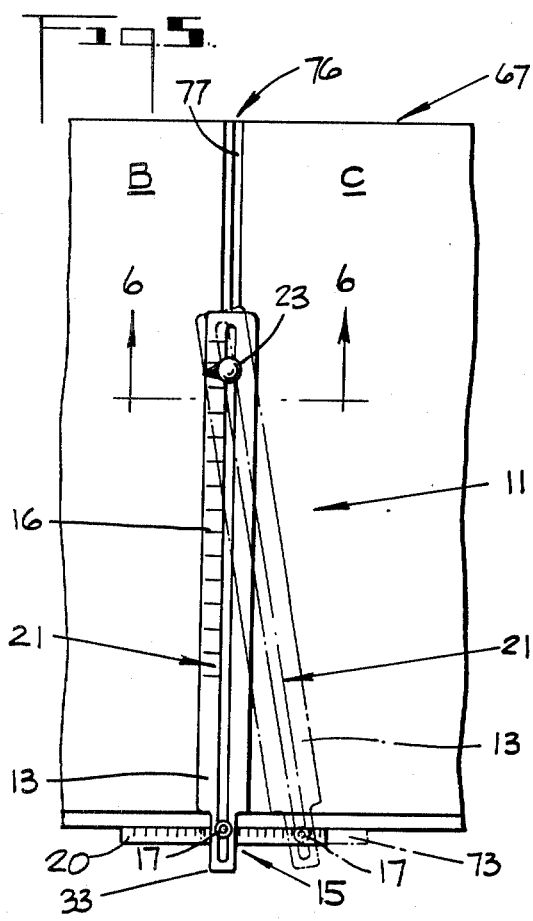

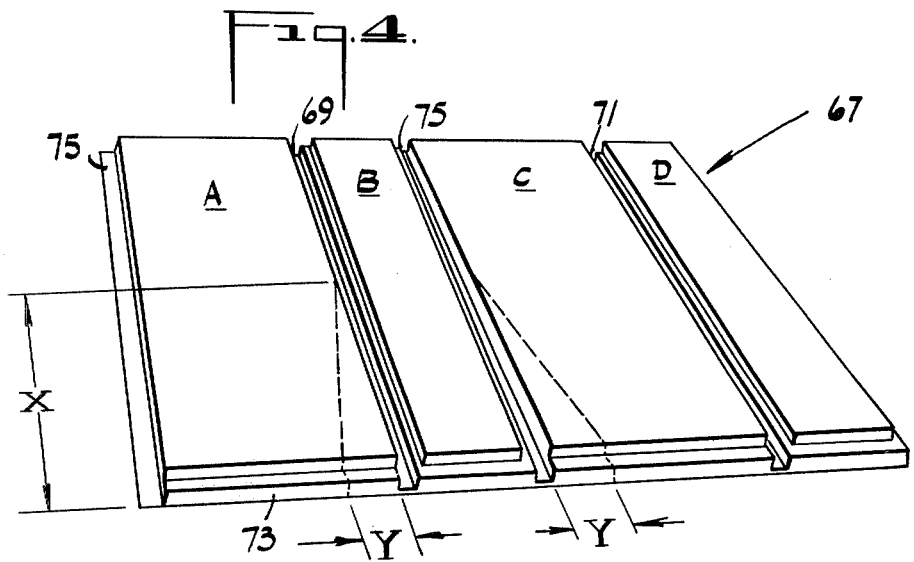
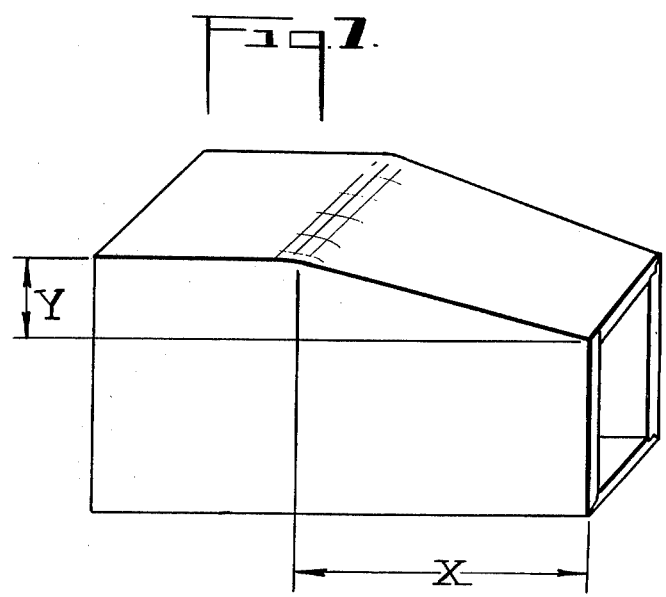

CUTTING GUIDE TOOL FOR FABRICATION OF AIR DUCT TRANSITIONS AND METHOD OF ITS USE

BACKGROUND OF THE INVENTION

The present apparatus and method relate generally to the fabrication of a transition duct from a grooved sheet of fibrous board and more particularly to apparatus and method for making transition cuts in a grooved sheet of fibrous board.

The use of densified glass fiberboards for air conditioning and other duct work is well-known. Such boards usually are continuously manufactured by apparatus which progressively densifies and heat cures a blanket or mat of binder impregnated glass fibers. Such boards may be as much as two inches thick after densification and may be as wide as eight feet or more. An outer cover for the duct to be formed from the board is adhered to the bottom surface of the board. This cover or skin often comprises a layer of Kraft paper adjacent the glass fibers, a second outer layer of a scrim-like fabric and an outermost layer of an air impervious material, such as aluminum foil, vinyl film, or the like. An example of such a board is that product sold and marketed by Johns-Manville Corporation as MICRO-AIRE Duct Board.

After the fireboard has been provided with its outer skin, it is conventional to cut, by an installer or by machinery, a set of laterally spaced apart, longitudinal grooves in the fireboard. Typical is the shiplap groove shown in FIG. 6 of the instant specification, which groove has been cut so as to remove most of the glass fiberboard leaving a thin layer adjacent its skin so that the board can be folded along the grooves upon itself to form a hollow rectangular configuration.

It is also known in the duct construction field that a transition piece, that is, a duct which has sidewalls which taper such that one duct end has a smaller transverse cross-section than the other end, may be fabricated from the precursor grooved board by cutting from the board at locations adjoining the grooves appropriately sized wedge-shaped pieces of the fiberboard. For example in a typical "one-way" transition i.e., one involving either a change in duct depth or width, entails removal of a wedge of material from each of two of the four rectangular panels that comprise each grooved sheet.

Heretofore in the preparation of transitions, a grooved sheet of fiberboard is placed upon a flat work surface, most commonly with the female edge of the sheet towards the fabricator, whose basic tools include a marking pencil, an incrementally marked straight-edge, and a cutting knife which has a sharp edge, a blunt edge and a flattened portion. In preparing a common "one-way" transition, for example, cutting marks are made upon the appropriate first panel and upon the opposite edge side of the equivalent panel e.g. the top and bottom panel of the duct. Using the straightedge as a measuring device, a mark reflecting the axial extent of the tapering portion of the duct is made at a point on a side edge of a first panel, and a second mark, corresponding to the desired change of duct depth or width is made at an appropriate point at the leading, or female edge of this first panel. The straightedge is aligned with the two marked points and held in place, and the cutting knife is drawn along the straightedge, cutting all the way through the glass fiber as well as the cover material. Using the blunt and slightly rounded edge of the knife, a second cut which scores the glass in the bottom of the deep part of the groove but not the underlying cover material, is made along the groove from the point of intersection with the first cut, to the leading edge of the sheet. Using the flat surface of the knife the resulting wedge-shaped piece of glass fiber is separated from the underlying flap of covered material and the glass material is removed. For a one-way transition the opposite side of the panel equivalent to the first panel is correspondingly marked and cut. A drawback in using the above-described tools and method for making transition cuts is in the time consumption involved, which problem is aggravated when one is presented with the more numerous measuring operations that are necessary for fabrication of the more complex transitions such as the "focal" transition in which two transition cuts must be made in each of the four panels comprising the sheet of fiberboard. It has also been found that the fair amount of hand and visual judgments involved in marking distances and aligning the straightedge between markings limit the accuracy and quality of the transition.

It is therefore the principal object of the instant invention to provide a method and apparatus for the quick and simple making of the necessary measurements for transition cuts in grooved sheets of fiberboard and the aligning of a cutting edge of guiding a cutting tool in making the cuts.

It is another object of the invention to provide an apparatus and method for controlling the accuracy and quality of transition cuts.

SUMMARY OF THE INVENTION

In keeping with the above objects, the present invention provides a cutting guide, for use with a rectangular sheet of fibrous board which has laterally spaced apart grooves extending across its major surface, to be used in conjunction with a knife-edged cutting tool, for making transition cuts in the sheet, that is, for selectively measuring and cutting wedge-shaped pieces of material from the four rectangular panels (as delineated by the grooves) that comprise the sheet. The cutting guide includes a guide strip that has a straight, flat first major surface and a longitudinally extending straight-edged slot. A second major guide strip surface is incrementally marked. There is a pivoting cross-arm that has a flat and straight first surface and a second surface which is incrementally marked about the mid-point of the cross-arm. At the cross-arm midpoint is fixed means for mounting the cross-arm within the guide strip slot, at a first end portion of the guide strip, for limited longitudinal movement back and forth within the slot from a position closest to that first end and one farthest therefrom and for pivoting of the cross-arm about an axis through the mounting means that is perpendicular to the first surface of the guide strip. The cross-arm first surface is held perpendicularly to the guide strip flat surface and the cross-arm graduated surface generally faces the same direction faced by the incrementally marked guide strip surface. These incremental markings relate to a reference line coinciding with the plane of the cross-arm flat surface when this surface is in the position farthest from the first end of the guide strip and perpendicular to the lengthwise direction of the slot.

The cutting guide also includes anchoring means, that is, mounted in the slot for movement over the major part of the length of the slot, being flexible at any point there along. The anchoring means also has a provision for engaging the sheet groove so as to be centrally located therein when the guide strip flat surface lies adjacent the major surface of the sheet, and for providing a pivot point for rotation of the guide strip about an axis through the anchoring means perpendicular to the major surface of the fibrous sheet. Preferably the anchoring means engages the groove with a shaft that extends perpendicularly of the guide strip's flat surface, the shaft having a thickness slightly less than the width of the groove and an end tip that is pointed.

The cutting guide of the invention is employed in making transition cuts in a grooved flat fibrous sheet by first securing the anchoring means at a location along the slot as indicated by the markings on the guide strip corresponding to the desired axial dimension to be obtained by the sloping, transition portion of the resultant duct. The cross-arm is moved to an initial position, that is, its position farthest from the first end of the guide strip and the cross-arm flat surface is placed into engagement with the edge of the fibrous sheet and adjacent a groove. The guide strip flat surface is disposed opposite the grooved sheet surface and the slit is aligned with the groove. The the anchoring means is then placed within the groove as the flat surface of the guide strip is brought to lie adjacent the surface of the fibrous sheet, the anchoring means engaging the sheet to provide a pivot point for rotation of the guide strip. Then a first cut is made by the cutting tool guided by the slot, to extend along the groove from the pivot point to the edge of the sheet. While the flat cross-arm surface is slidably maintained in contact with the sheet edge the guide strip is rotated away from the first cutting position to a second cutting position such that the cross-arm is moved for a predetermined number of increments, as marked on the cross-arm, to one side of the intersection point of the first cut and the sheet edge. During this pivoting movement of the guide strip the cross-arm mounting means moves freely for a distance along the slot. Using the cutting tool guided by the slot, a second cut is made through the sheet to intersect the first cut and the edge of the sheet.

BRIEF DESCRIPTION OF THE DRAWINGS

FIG. 1 is a view in perspective showing a cutting guide tool for duct transitions according to the invention.

FIG. 2 is an enlarged, exploded view in perspective and from below illustrating one end portion of the apparatus of FIG. 1.

FIG. 3 is an enlarged, exploded view in perspective illustrating the anchoring pin assembly of the apparatus of FIG. 1.

FIG. 4 is a view in perspective showing a grooved sheet or duct board.

FIG. 5 is a fragmentary plan view of the cutting guide of the invention in use with a grooved duct board according to the invention.

FIG. 6 is an enlarged cross-sectional view taken along lines 6—6 of FIG. 5.

FIG. 7 is a view in perspective showing the fibrous sheet of FIG. 4 after its fabrication into a transition duct.

DESCRIPTION OF THE PREFERRED EMBODIMENT

Referring to FIG. 1, there is disclosed a cutting guide tool 11 that comprises a guide strip 13 having a longitudinally extending straight edged slot 21 extending therethrough for most of the length thereof, an anchor pin assembly 23 residing in slot 21 and a cross-arm 15 which is pivotally mounted within an end portion of slot 21 at 17. Guide strip 13 is preferably fabricated from black anodized quarter-inch aluminum strip and the cross-arm 15 is made of black anodized one-eighth-inch aluminum. Cross-arm 15 is mounted at 17, which mounting is described in greater detail below, so that cross-arm 15 may slidably move to-and-fro longitudinally within an end portion of slot 21 over a limited distance of about two inches. A number of incremental markings 16 measure a distance along slot 21 originating on a reference line across surface 14, with reference line lies in the same plane as cross-arm surface 19 when cross-arm 15 is in its forwardmost position as shown in FIG. 1 with surface 19 oriented perpendicularly to the lengthwise direction of slot 21. The first of the engraved incremental markings, 16(a) is for twelve inches; the markings being spaced at two-inch increments up to a forty-inch marking toward the front end of slot 21 in the preferred embodiment.

The graduations on the cross-arm surface 20 comprise engraved markings and numerals emanating in one-inch increments to one side and the other of the midpoint of cross-arm 15.

As FIG. 2 shows, on the rear end portion of the guide strip bottom surface 34 there is a cross-arm mounting slot 33 that is milled partially into surface 34 and having the same longitudinal axis of slot 21. Cross-arm spacer 29, which is preferably constructed of a low friction plastic material, such as Nylon, engages both slots 21 and 33. The diameters of spacer lower portion 31 as viewed in FIG. 2 and upper flange portion 30 are slightly less than the width of slots 21 and 33 respectively, so that spacer 29 may slidably move to-and-fro within the slots yet with a minimum of lateral play therein. As indicated in FIG. 2 cross-arm 15 is assembled in its pivotal mounting by bolt 25 which passes through a washer 27 on the bottom side, as viewed in FIG. 2, of guide strip 13, through slots 21 and 33, spacer 29, and cross-arm center hole 41 to be fastened to nut 43. Washer 27 is preferably made of the same material as spacer 29. The depths of the lower spacer portion 31 and the upper flange portion 30 are each slightly greater respectively than the lower slot edge 35 and the upper slot edge 37. This ensures that in its assembled configuration, with the bottom surface of spacer portion 31 engaging the washer 27 and the cross-arm surface 20 engaging the top of spacer 29, there will be sufficient vertical spacing between surface 20 and guide strip surface 34 as well as between the lower surface of spacer flange portion 30 and washer 27 so as to provide for free longitudinal movement to-and-fro within the slot 33 with a minimum of vertical play therein. Similarly, these features provide for rotation of cross-arm 15 about the vertical axis through bolt 25. The forward movement of cross-arm 15 as viewed in FIG. 2 is limited by the engagement of the edge of spacer portion 31 with curved edge 29 and the rearward movement is stopped when flange 30 engages curved edge 40.

The anchor pin assembly, shown in FIG. 3, comprises a securing knob 45 which is threaded in its lower central portion (not shown), a pointer 47 and an anchoring pin 49. Pointer 47 has hole 53 extending completely vertically therethrough. A lower portion 51 of the pointer has flat guiding surfaces 55 (best shown in FIG. 6) located on opposite sides thereof and parallel to each other. The spacing between surfaces 55 is slightly less than the width of slot 21, and the depth of portion 51 (best shown in FIG. 6) is slightly less than the thickness of guide strip 13. Holding pin 57 depends downwardly from the bottom of portion 51. Anchoring pin 49 has an upper threaded portion 59 and a lower, pointed shaft 61. Firmly affixed between portions 59 and 61 is clamping flange 63 which has a hole 65 drilled therethrough. Upon assembly, threaded portion 59 passes through hole 53 to engage the threads of knob 45 and holding pin 57 will engage hole 65. When knob 45 is tightened the pointer surfaces 55 will prevent the pointer 47 from turning therewith and holding pin 57 will hold the anchoring pin 49 from turning. When knob 45 is fully tightened the lower surface of pointer 47 and the flange 63 of the anchoring pin 49 will engage the guide strip 13 in a clamping action. When the knob 45 is loosened somewhat the anchor pin assembly 23 may be slid to-and-fro along the full extent of slot 21.

FIG. 4 shows a typical grooved sheet 67 of fibrous duct board prior to its being cut with the use of the apparatus of the invention for fabrication into a transition duct. There are laterally spaced grooves 69, 76 and 71 cut into the top surface of sheet 67 which has a female leading edge at 73. These grooves are of the shiplap type, the cross-sectional configuration of which is best illustrated in FIG. 6. There is a fluid impervious, heat reflective backing material 75 adhered to the lower surface of sheet 67.

In the operation of the apparatus according to the invention the knob 45 is loosened and the anchor pin assembly 23 is moved to and then secured at the one of markings 16 which reflects the desired transition length X (shown in FIGS. 4 and 7). The sheet 67 is placed upon a flat surface with the female edge orientated as shown in FIG. 4. The fabricator moves the cross-arm to an initial position within slot 33 that is its forwardmost position therein as viewed in FIG. 1. Then, as illustrated in FIG. 5, cross-arm 15 is brought into contact with the edge 73 with cross-arm surface 19 held flush thereagainst. Guide strip 13 is held over and adjacent the top surface of sheet 67 and the slot 21 is placed into alignment with the deeper slot 77 of the shiplap groove 76.

Anchor shaft 61, which has a diameter that is preferably slightly less than the width of deep slot 77 of the shiplap groove 76, is placed within shiplap slot 77 with its pointed tip engaging the fibrous material as well as the backing 75 that lies below slot 77. With guide strip 13 thusly anchored, the free end of cutting guide 11 is moved to the right or the left of the initial alignment position, during which movement pivot point 17 is allowed to freely move with respect to slot 33 while cross-arm surface 19 is maintained in sliding contact.

Where, for example, it is desired to fabricate a "one-way" transition such as the one shown in FIG. 7 which has one end Y inches shorter in depth than the other end, the guide strip 13 is moved to a position in which Y inches, as indicated by markings on cross-arm surface 20, is aligned with an edge of the deeper shiplap slot 77. To construct the duct shown in FIG. 7 transition cuts must be made to the panel A shown in FIG. 4 and its equivalent panel C. Using a blunt, slightly rounded edge of a cutting knife, and guided by slot 21, a first cut or score is made along the bottom of shiplap slot 77 such that the backing material 75 is scraped but not cut through. Then guide strip 13 is moved to the right as shown in FIG. 5 in order to make a transition cut through panel C. The distance Y as read on cross-arm surface 20 is aligned with the right-hand edge of the deeper slot 77 and a cut is made completely through panel C along a line intersecting the right-hand edge of the deeper groove 77 and extending to edge 73, the hand tool being guided by the right-hand edge of guide slot 21.

Were it necessary to swing guide strip 13 to the left as shown in FIG. 5 to make a transition cut in panel B, then cross-arm alignment would be made with the leftward edge of the deeper shiplat slot 77, and the knife-edge would be guided by the leftward edge of the guide slot 21.

Having completed the cut to panel C and along the bottom of slot 77 the fabricator then, using an appropriate tool, will remove the resultant wedge-shaped piece of fibrous board material. In constructing the transition of FIG. 7 the fabricator will remove the cutting guide 11 to the groove 69 as shown in FIG. 4 and use a similar procedure to make a transition cut of corresponding dimension into the right-hand side of panel A.

In describing this invention a certain embodiment has been used to illustrate the invention and the practice thereof. However, it is to be understood that the invention is not limited to this specific embodiment, as other embodiments and modifications within the sphere of the invention will readily occur to those skilled in the art on reading this Specification. Accordingly, it should be appreciated that the above disclosure is to be read as illustrative and not in a limiting sense.

I claim:

1. A cutting guide for use with a flat rectangular sheet of fibrous board, said sheet having grooves extending across a major surface thereof and perpendicular to an edge thereof and for use with a cutting tool for cutting a wedge-shaped piece of material from said fibrous board comprising:
   (a) a guide strip having a flat first major surface and a longitudinally extending straight-edged slot, said slot passing through said guide strip, and a second major surface having incremental markings thereon adjacent said slot;
   (b) a cross-arm having a first surface adapted to contact said edge and a second surface having similar incremental markings extending in opposite directions from a central location, means for mounting said cross-arm in said slot at a first end portion of said guide strip such that said cross-arm first surface is generally perpendicular to said guide strip first major surface and said cross-arm second surface is generally facing in the same direction faced by said guide strip second major surface, and said cross-arm freely pivots about its midpoint on an axis perpendicular to said guide strip first major surface, and said mounting means slidably engages said slot for movement only along a limited extent of said slot, the incremental markings on said guide strip beginning on a reference line coinciding with the plane of said cross-arm first surface when said surface is in the position farthest from said first end of said guide strip and perpendicular to the lengthwise direction of said slot; and
   (c) anchoring means mounted in said slot for movement over the incrementally marked extent of said slot and for being fixed at any point there along, and said anchoring means also having means for engaging said groove so as to be centrally located therein when said guide strip first major surface lies flatly adjacent said major surface of said fibrous sheet, and for providing a pivot point for rotation of said guide strip about an axis through said anchoring means perpendicular to said major surface of said fibrous sheet.

2. Apparatus as defined in claim 1 wherein said anchoring means has means for engaging said groove that comprises a shaft extending perpendicularly of said guide strip first major surface and having a thickness slightly less than the width of said groove, and an end tip that is pointed.

3. Apparatus as defined in claim 1 wherein said graduation marks on said cross-arm second surface extend on both sides of the cross-arm midpoint, about said midpoint.

4. Method for cutting a wedge-shaped piece of fibrous material from a rectangular sheet of fibrous board, said sheet having grooves extending across its top surface and perpendicular to an edge thereof by using a knife-edged hand cutting tool in conjunction with a cutting guide, said cutting guide comprising a guide strip having a flat lower surface and having a longitudinally extending straight slot which is incrementally marked on the upper surface of said strip, and anchoring means mounted for longitudinal movement along said slot and for being fixed to said strip at any point along said slot and, when said lower guide strip surface lay flatly adjacent said sheet upper surface said anchoring means engaging said groove to be located by said groove centrally within said groove and engaging said panel to provide for a pivot point for rotation of said guide strip about a vertical axis through said pivot point, and a cross-arm located at one end of said strip, having a straight, flat vertical surface and an upper surface which is marked in graduations over the length thereof, the mid portion of said cross-arm having means attached thereto for slidably engaging said slot at a first end portion of said guide strip for limited motion longitudinally within said slot and for the pivoting of said cross-arm about a vertical axis through said mid portion, the said strip beginning with a reference mark that coincides with the plane of said cross-arm vertical surface when said vertical surface is perpendicular to the lengthwise direction of said slot and when said cross-arm mounting means is in an initial position within said slot farthest from said first end of said guide strip, said method comprising the steps of:

(a) securing said anchoring means at a predetermined location along said slot, (b) moving said cross-arm mounting means to said initial position, (c) placing said cross-arm flat surface into engagement with said sheet edge, with said guide strip lower surface disposed adjacent said panel upper surface and bringing said slot into alignment with said groove, (d) placing said anchoring means within said groove and resting said lower guide strip surface flatly adjacent said sheet upper surface such that said anchoring means engages said sheet to provide a pivot point for rotation of said guide strip, (e) making a first cut through said sheet using said knife edged tool guided by an edge of said slot, said cut extending along said groove from said pivot point to the edge of said sheet, (f) while said flat cross-arm surface is slidably maintained in contact with said panel edge, rotating said guide strip away from said first cutting position to a second cutting position such that said cross-arm is moved for a predetermined number of graduations, as marked on said cross-arm, to one side of the intersection point of said panel groove and edge, said cross-arm mounting means moving for a distance along said slot, and (g) using said knife edged cutting tool guided by an edge of said slot, making a second cut through said sheet, said second cut intersecting said first cut and said sheet edge.

* * * * *

UNITED STATES PATENT AND TRADEMARK OFFICE
CERTIFICATE OF CORRECTION

PATENT NO. : 4,179,808
DATED : December 25, 1979
INVENTOR(S) : Harvell M. Smith

It is certified that error appears in the above-identified patent and that said Letters Patent are hereby corrected as shown below:

Column 1, line 28, "fireboard" should read --fiberboard--

Column 1, line 31, "fiberboard" should read --fiberboard--

Column 1, line 58, delete "edge"

Column 2, line 23, "limit" should read --limits--

Column 2, line 28, "of" second occurrence should read --for--

Column 2, line 68, "flexible" should read --fixable--

Column 3, line 23, "slit" should read --slot--

Column 4, line 14 "with" should read --which--

Column 4, line 30, "of" should read --as--

Column 4, line 60, number "29" should read --39--

Signed and Sealed this

Twenty-seventh Day of May 1980

[SEAL]

Attest:

SIDNEY A. DIAMOND

Attesting Officer

Commissioner of Patents and Trademarks